United States Patent
Imamiya

(10) Patent No.: US 11,010,030 B2
(45) Date of Patent: May 18, 2021

(54) ELECTRONIC APPARATUS CAPABLE OF PERFORMING DISPLAY CONTROL BASED ON DISPLAY MODE, CONTROL METHOD THEREOF, AND NON-TRANSITORY COMPUTER READABLE MEDIUM

(71) Applicant: CANON KABUSHIKI KAISHA, Tokyo (JP)

(72) Inventor: Junichi Imamiya, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/260,323

(22) Filed: Jan. 29, 2019

(65) Prior Publication Data

US 2019/0243533 A1    Aug. 8, 2019

(30) Foreign Application Priority Data

Feb. 7, 2018    (JP) .............................. JP2018-020109

(51) Int. Cl.
    *G06F 3/0484*    (2013.01)
    *H04N 5/232*    (2006.01)
    (Continued)

(52) U.S. Cl.
    CPC ........... *G06F 3/04845* (2013.01); *G02B 7/09* (2013.01); *G02B 7/346* (2013.01);
    (Continued)

(58) Field of Classification Search
    CPC ............ G06F 3/04845; H04N 5/23212; H04N 5/232939; H04N 5/232127; H04N 5/23293; G02B 7/09
    See application file for complete search history.

(56) References Cited

U.S. PATENT DOCUMENTS 8,717,477 B2 *    5/2014    Oogami ............. H04N 5/23293
                                                          348/333.01
2012/0274825 A1    11/2012    Oogami
                          (Continued)

FOREIGN PATENT DOCUMENTS

CN    101547313 A    9/2009
CN    102739939 A    10/2012
                (Continued)

OTHER PUBLICATIONS

The above documents were cited in a Sep. 29, 2020 Chinese Office Action, which is enclosed with an English Translation, that issued in Chinese Patent Application No. 201910104230.5.

*Primary Examiner* — Namitha Pillai
(74) *Attorney, Agent, or Firm* — Cowan, Liebowitz & Latman, P.C.

(57) ABSTRACT

A display controller including: a display control unit configured to, in response to a first case, perform control so that an image is displayed in a display mode among a plurality of display modes wherein the first case is a case where a receiving unit has received a manual focus operation in a first state in which a display item indicating information on focus is not superimposed or displayed on a live-view image captured by an imaging unit and the live-view image is displayed with a first magnification wherein the plurality of display modes include: a first display mode in which the display item is superimposed and displayed on the live-view image without enlarging the live-view image from the first magnification; and a second display mode in which the live-view image is displayed with a second magnification larger than the first magnification.

7 Claims, 8 Drawing Sheets

(51) Int. Cl.
*G06F 9/30* (2018.01)
*G02B 7/09* (2021.01)
*G02B 7/34* (2021.01)

(52) U.S. Cl.
CPC ........ *G06F 3/04842* (2013.01); *G06F 9/3004* (2013.01); *H04N 5/232127* (2018.08)

(56) References Cited

U.S. PATENT DOCUMENTS

| | | | | |
|---|---|---|---|---|
| 2014/0198244 | A1* | 7/2014 | Hamada | G03B 13/18 |
| | | | | 348/346 |
| 2015/0103223 | A1* | 4/2015 | Park | H04N 5/23212 |
| | | | | 348/333.12 |
| 2016/0295120 | A1* | 10/2016 | Ota | H04N 5/23293 |

FOREIGN PATENT DOCUMENTS

| | | | |
|---|---|---|---|
| CN | 106060377 A | 10/2016 | |
| JP | 2006-054536 A | 2/2006 | |
| JP | 2016-197180 A | 11/2016 | |
| WO | WO-2019113737 A1 * | 6/2019 | ............. G02B 17/20 |

* cited by examiner

IN-FOCUS

FRONT-FOCUS

BACK-FOCUS

LARGE BOKEH

ELECTRONIC APPARATUS CAPABLE OF PERFORMING DISPLAY CONTROL BASED ON DISPLAY MODE, CONTROL METHOD THEREOF, AND NON-TRANSITORY COMPUTER READABLE MEDIUM

BACKGROUND OF THE INVENTION

Field of the Invention

The present invention relates to a display controller, a control method thereof, and a non-transitory computer readable medium.

Description of the Related Art

A display device that calculates a focus evaluation value of a subject using a distance measurement sensor and a plurality of imaging sensors and displays a front-focus state, a back-focus state, or an out-of-focus state of the subject being imaged has been proposed. Such a display function is referred to as a focus guiding function.

Japanese Patent Application Publication No. 2006-054536 proposes the following technology. A portion of a live-view image is displayed at an enlarged scale when a focus ring is operated during a manual focus mode and a diaphragm is maintained in an open state so that a user can adjust focusing in a shallow depth-of-field state by referring to the enlarged image.

Japanese Patent Application Publication No. 2016-197180 proposes a technology of displaying a display item indicating a degree of focus at a position at which a subject which is a target of focus adjustment is displayed so that the display item is superimposed on a live-view image.

SUMMARY OF THE INVENTION

However, according to the technology proposed in Japanese Patent Application Publication No. 2006-054536, since a live-view image is displayed at an enlarged scale, it is not possible to adjust the focus while checking the entire composition. Moreover, since the diaphragm is in an open state, the focus is adjusted while viewing an image captured with a diaphragm value different from that used during actual capturing.

Japanese Patent Application Publication No. 2016-197180 proposes a case in which the focus guide is displayed or not when a live-view image is enlarged according to an operation of a zoom key. However, a method of enlarging the live-view image according to a manual focus operation is not discussed. Therefore, it is not possible to perform a manual focus operation while checking a focusing state with a live-view image which is automatically enlarged according to a manual focus operation.

An object of the present invention is to enable focusing to be adjusted in a more appropriate display mode depending on a situation when manual focus adjustment is performed in a state in which a live-view image is displayed.

In order to achieve the above object,

A display controller comprising:

a memory and at least one processor and/or at least one circuit to perform the operations of the following units:

a receiving unit configured to receive a manual focus operation;

a setting unit configured to set whether a predetermined function will be executed or not according to the manual focus operation wherein the predetermined function is a manual focus assist function; and a display control unit configured to, in response to a first case, perform control so that an image is displayed in a display mode corresponding to a setting state of the setting unit among a plurality of display modes, wherein the first case is a case where the receiving unit has received the manual focus operation in a first state in which a display item indicating information on focus is not superimposed or displayed on a live-view image captured by an imaging unit and the live-view image is displayed with a first magnification, wherein the plurality of display modes include:

a first display mode in which the display item is superimposed and displayed on the live-view image without enlarging the live-view image from the first magnification; and a second display mode in which the live-view image is displayed with a second magnification larger than the first magnification.

According to the present invention, focusing can be adjusted in a more appropriate display mode depending on a situation when manual focus adjustment is performed in a state in which a live-view image is displayed.

Further features of the present invention will become apparent from the following description of exemplary embodiments with reference to the attached drawings.

DESCRIPTION OF THE EMBODIMENTS

Hereinafter, a preferred embodiment of the present invention will be described in detail with reference to the accompanying drawings.

<Configuration of Imaging System>

Figure 1:
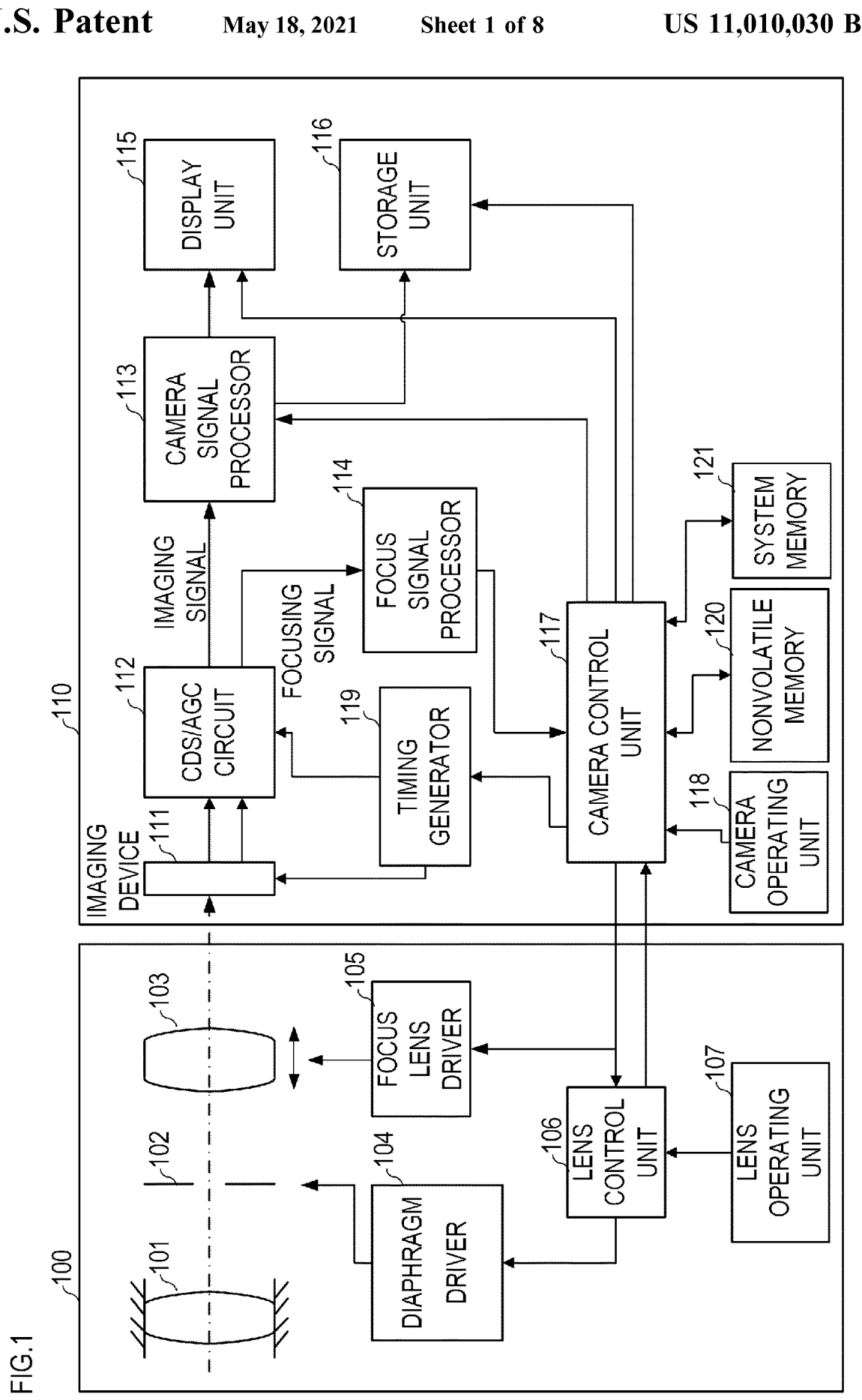
FIG. 1 is a block diagram illustrating a schematic configuration of an imaging system according to an embodiment.

FIG. 1 is a block diagram illustrating a schematic configuration of an imaging system having a focus guiding function as an example of a display controller according to an embodiment of the present invention. Although a lens-exchangeable imaging system is used in the present embodiment, an imaging apparatus having a fixed lens may be used.

As illustrated in FIG. 1, the imaging system of the present embodiment includes a lens unit 100 and a camera body 110. A lens control unit 106 that controls the operation of the entire lens unit 100 in an integrated manner and a camera control unit 117 that controls the operation of the entire imaging system in an integrated manner communicate data with each other.

First, a configuration of the lens unit 100 will be described.

The lens unit 100 has an imaging optical system including a fixed lens 101, a diaphragm 102, a focus lens 103, a zoom lens (not illustrated), and the like. The diaphragm 102 is driven by a diaphragm driver 104 to control the amount of light incident on an imaging device 111 to be described later. The focus lens 103 is driven by a focus lens driver 105 and is used for adjustment of a focal point. The zoom lens (not illustrated) is driven by a zoom lens driver and is used for adjustment of zooming. In the present embodiment, the zoom lens and the zoom lens driver are not essential elements but may be omitted.

The diaphragm driver 104, the focus lens driver 105, and the zoom lens driver are controlled by the lens control unit 106 whereby an aperture diameter of the diaphragm 102 and the positions of the focus lens 103 and the zoom lens are controlled. When focusing, zooming, and the like are operated by a user operating a focus ring, a zoom ring, and the like provided in a lens operating unit 107, the lens control unit 106 performs control corresponding to the user's operation. In the present embodiment, the focus ring is a rotary encoder that outputs an electronic signal and generates a pulse signal according to a rotating operation and this pulse signal is transmitted to the camera control unit 117 to be described later. The camera control unit 117 transmits a driving control signal for a focus lens to the lens control unit on the basis of the pulse signal received from the focus ring. The lens control unit 106 controls the diaphragm driver 104, the focus lens driver 105, and the zoom lens driver and transmits lens information to the camera control unit 117 according to a control command or control information received from the camera control unit 117. The focus lens driver 105 drives lenses with the aid of a driver such as a motor, an actuator, and the like. An operating member that receives a manual focus operation (an MF operation) is not limited to the focus ring provided in the lens operating unit 107, but the manual focus operation may be received by another operating member. For example, the camera control unit 117 may transmit a driving control signal for the focus lens to the lens control unit 106 according to an operation on an electronic dial, a cross-shaped key, or the like provided in the camera body 110 so that an MF operation can be realized.

Next, a configuration of the camera body 110 having a focus guiding function according to the present embodiment will be described.

In the camera body 110, the imaging device 111 is configured as a CCD or CMOS sensor, and a laser beam having passed through the imaging optical system of the lens unit 100 is formed on a light-receiving surface of the imaging device 111. The formed subject image is photoelectrically converted to charges corresponding to the amount of incident light by photodiodes (photoelectric conversion units) of the imaging device 111 and the charges are stored therein. The charges stored in the respective photodiodes are sequentially read from the imaging device 111 as a voltage signal corresponding to a charge on the basis of a driving pulse supplied from a timing generator 119 according to a command from the camera control unit 117. Although the detailed configuration of the imaging device 111 will be described later, the imaging device 111 of the present embodiment can output a pair of focusing signals which can be used for phase-difference-type focal point detection in addition to general imaging signals.

The imaging signal and the focusing signal read from the imaging device 111 are input to a CDS/AGC circuit 112, and correlated double sampling, gain adjustment, and digitalization are performed to remove reset noise. The CDS/AGC circuit 112 outputs the processed imaging signal to a camera signal processor 113 and outputs the focusing signal to a focus signal processor 114. The camera signal processor 113 performs various image processes on the imaging signal output from the CDS/AGC circuit 112 to generate a video signal. A display unit 115 is a display device such as an LCD or an organic EL and displays an image based on the video signal output from the camera signal processor 113. Moreover, in a recording mode of recording imaging signals, the imaging signal is transmitted from the camera signal processor 113 to a recording unit 116 and is recorded on a recording medium such as an optical disc, a semiconductor memory (a memory card), or a magnetic tape.

The focus signal processor 114 performs a correlation operation on the basis of the pair of focusing signals output from the CDS/AGC circuit 112 to detect a focusing state. In this embodiment, a correlation amount, a defocus amount, and reliability information (a two-image coincidence level, a two-image steepness level, contrast information, saturation information, flaw information, and the like) are calculated. The calculated defocus amount and reliability information are output to the camera control unit 117. Moreover, the camera control unit 117 notifies the focus signal processor 114 of changes in setting for calculating the above-mentioned items of information on the basis of the acquired defocus amount and reliability information.

The camera control unit 117 exchanges information with respective components in the camera body 110 to perform control. Moreover, the camera control unit 117 receives a user's operation and controls ON/OFF of power, change of settings, and recording according to the input from the camera operating unit 118 operated by the user as well as the process within the camera body 110. Furthermore, the camera control unit 117 sets whether a predetermined function will be executed or not according to a manual focus operation. The process function includes a display function of displaying a focus guide and an enlarging function of enlarging a live-view image. Here, a live-view image is a captured image which has been captured by the imaging device 111 and on which a live-view image process has been performed by the camera signal processor 113 and is an image which is updated sequentially at a predetermined frame rate. Furthermore, the camera control unit 117 executes various functions corresponding to a user's operation such as switching of autofocus (AF)/manual focus (MF) control and confirmation of a recorded video. Moreover, as described above, the camera control unit 117 exchanges information with the lens control unit 106 in the lens unit 100, transmits a control command or control information of the imaging optical system, and acquire information in the lens unit 100.

The camera control unit 117 realizes respective processes of the present embodiment by executing a program recorded on a nonvolatile memory 120. A system memory 121 is a RAM, for example, and the camera control unit 117 deploys operation constants and variables of the camera control unit 117 and a program and the like read from the nonvolatile memory 120 onto the system memory 121.

The nonvolatile memory 120 is an electrically erasable and recordable memory and an EEPROM or the like, for example, is used. The operation constants of the camera control unit 117, a program, and the like are stored in the nonvolatile memory 120. The program mentioned herein is a program for executing various flowcharts to be described later in the present embodiment.

<Configuration of Imaging Device>

Figure 2:
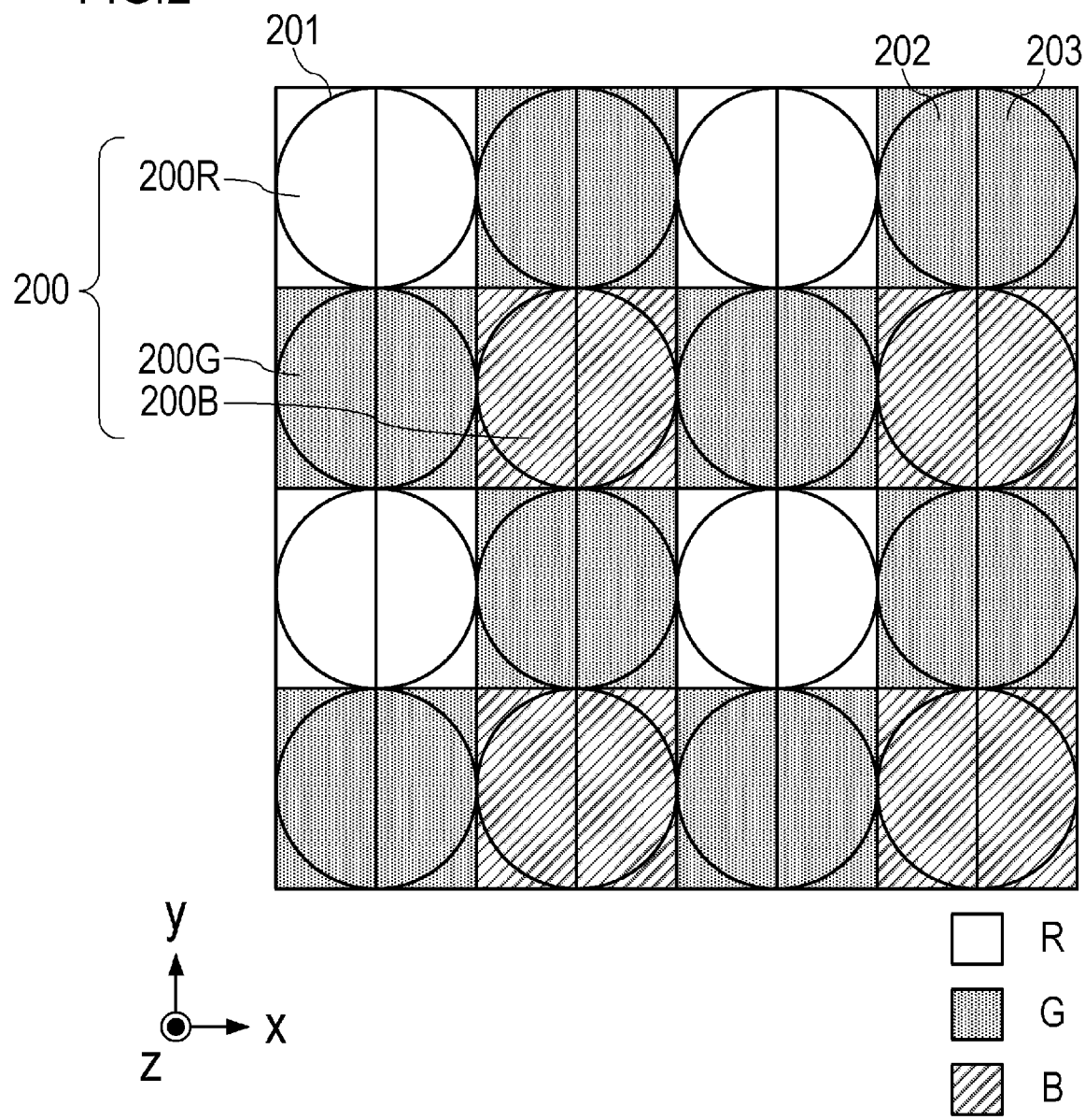
FIG. 2 is a schematic diagram of a pixel arrangement in an imaging device according to an embodiment.

FIG. 2 is a diagram schematically illustrating a pixel arrangement of the imaging device 111 according to the present embodiment.

FIG. 2 illustrates a range of 4 columns by four rows of imaging pixels (a range of eight columns by four rows as an arrangement of focal point detection pixels) as a pixel arrangement of a two-dimensional CMOS sensor used as the imaging device 111 in the present embodiment.

In the present embodiment, a pixel group 200 is made up of two columns by two rows of pixels and is covered by color filters of the Bayer arrangement. In the pixel group 200, a pixel 200R having spectral sensitivity to R (red) is disposed at a top-left position, a pixel 200G having spectral sensitivity to G (green) is disposed at a bottom-left position, and a pixel 200B having spectral sensitivity to B (blue) is disposed at a bottom-right position. Furthermore, since the imaging device 111 of the present embodiment performs focus detection according to an imaging plane phase-difference scheme, one microlens 201 retains a plurality of photodiodes (photoelectric conversion units). In the present embodiment, each pixel is made up of two photodiodes 202 and 203 arranged in two columns by one row.

The imaging device 111 can acquire imaging signals and focusing signals since a number of pixel groups 200 each made up of two columns by two rows (four columns by two rows of photodiodes) illustrated in FIG. 2 are arranged on an imaging plane.

In each pixel having such a configuration, a laser beam is split by the microlens 201 and is formed on the photodiodes 202 and 203. A signal (a signal A+B) obtained by adding signals from two photodiodes 202 and 203 is used as the imaging signal, and two signals (A and B-phase signals) read from the individual photodiodes 202 and 203 are used as focusing signals. Although the imaging signal and the focusing signal may be read respectively, the signals may be read as follows by taking a processing load into consideration. That is, the imaging signal (signal A+B) and the focusing signal (for example, signal A) of any one of the photodiodes 202 and 203 may be read and a difference thereof may be taken whereby the focusing signal (for example, signal B) of the other photodiode is acquired.

In the pixels of the present embodiment, although one microlens 201 has two photodiodes 202 and 203, the number of photodiodes is not limited to two but two or more photodiodes may be provided. Moreover, the microlens 201 may have a plurality of pixels in which the opening positions of light-receiving portions are different. That is, it is sufficient if two phase-difference detection signals of which the phase difference can be detected such as A-phase signal and B-phase signals are obtained.

Although FIG. 2 illustrates a configuration in which all pixels have a plurality of photodiodes, the present invention is not limited thereto, and such focus detection pixels as illustrated in FIG. 2 are provided discretely in normal pixels that form the imaging device 111.

<Focus Guide Display Mode>

Next, a display mode of a focus guide (a guide item and a display item) according to the present embodiment will be described with reference to FIGS. 3A to 3D.

In the present embodiment, a focus guide displays information on the basis of a defocus amount acquired from an imaging range corresponding to a position (within a frame) on which the focus frame 300 is superimposed among display elements of the focus guide on the live-view image. More specifically, the focus guide indicates a degree of focus on the basis of a defocus amount to be described later. The defocus amount is a defocus amount calculated on the basis of an output value from a pixel group within a range corresponding to the position of the focus frame 300 among the pixels (pixels capable of detecting an imaging-plane phase difference) capable of acquiring the defocus amount disposed in the imaging device 111. That is, the focus guide displays information related to focus with respect to a subject at the position at which the subject is superimposed on the live-view image. In the present embodiment, first to fourth index display modes are used as the type of a focus guide display mode, and a detected focusing state is represented by display parts (display elements) 301 to 311. The display parts 301 to 311 are disposed in an upper portion of the focus frame 300.

Figure 3A:
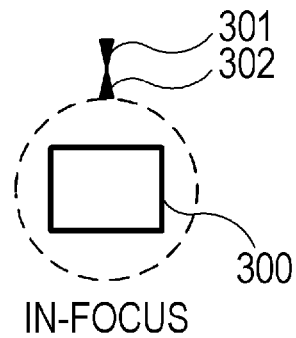
FIGS. 3A to 3D are diagrams illustrating examples of a focus guide according to an embodiment.

FIG. 3A illustrates a state in which it is determined that a subject is in-focus as an example of the first index display mode.

In the state in which it is determined that the subject is in-focus, the position of the display part 301 on the outer side and the position of the display part 302 on the inner side coincide with each other (in this example, the display parts stop at the upper portion of the focus frame 300). When it is determined that the subject is in an in-focus state, for example, the display part 301 and the display part 302 may be represented in a color (for example, green) different from the colors (for example, white) of other display modes. The display part 301 is a display part in which display parts 307 and 308 to be described later are combined to be represented as one display part. The display part 302 is a display part in which display parts 304 and 305 to be described later are combined to be represented as one display part.

Figure 3B:
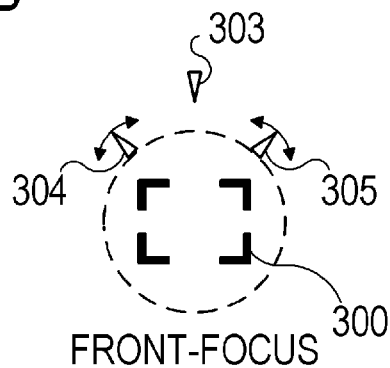
Figure 3C:
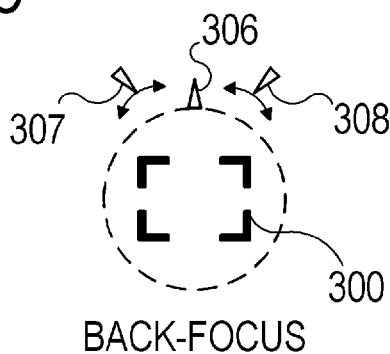

FIGS. 3B and 3C are diagrams illustrating examples of the second and third index display modes, respectively, and illustrate a display example in which, although the subject is not in-focus, the reliability of a focal-point detection result is high, and the direction to an in-focus position and the magnitude of the defocus amount are illustrated.

FIG. 3B illustrates a display example in which a focal point lies closer to the front side than the subject (a front-focus state). In this case, in a state in which the display part 303 on the outer side stops at the upper portion of the focus frame 300, the display parts 304 and 305 on the inner side move bilaterally symmetrically along a circumference surrounding the focus frame 300 with change in the defocus amount. Here, the display part 303 on the outer side is depicted as an inwardly pointing triangle, and the display parts 304 and 305 on the inner side are depicted as an outwardly pointing triangle. The positions of the display parts 304 and 305 represent the magnitude of the defocus amount, and the farther both display parts moving from the position (a reference position) of the display part 303, the larger becomes the defocus amount. The display part 303 corresponds to the display part 301, and a state in which the display parts 304 and 305 overlap each other corresponds to the display part 302.

FIG. 3C illustrates a case in which a focal point lies closer to the infinity side than the subject (a back-focus state). In this case, in a state in which the display part 306 on the inner side stops at the upper portion of the focus frame 300, the display parts 307 and 308 on the outer side move bilaterally symmetrically along the circumference surrounding the focus frame 300 with change in the defocus amount. Here, the display part 306 on the inner side is depicted as an outwardly pointing triangle, and the display parts 307 and 308 on the outer side are depicted as an inwardly pointing triangle. The positions of the display parts 307 and 308 represent the magnitude of the defocus amount, and the farther both display parts moving from the position (a reference position) of the display part 306, the larger becomes the defocus amount. The display part 306 corresponds to the display part 302, and a state in which the display parts 307 and 308 overlap each other corresponds to the display part 301.

As described above, in the second and third index display modes, the magnitude of the defocus amount can be represented by the positions of moving display parts. Moreover, the direction (a defocus direction) to the in-focus position can be represented by the direction of a display part stopping at the upper portion of the focus frame 300.

Figure 3D:
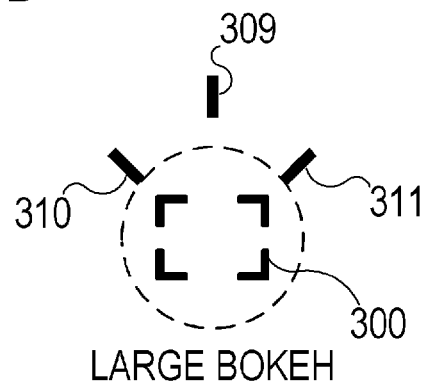

FIG. 3D is a diagram illustrating an example of the fourth index display mode and is a diagram illustrating a case in which the reliability of a focal-point detection result is low. In this case, the magnitude of the defocus amount and the defocus direction are not depicted and the user is informed of the fact that it is not possible to detect the focal point. In the present embodiment, the respective display parts 309 to 311 are displayed in color (for example, gray) different from the colors of other display modes and the display parts 309 to 311 are fixed to predetermined positions. Moreover, the shapes of the display parts 309 to 311 are different from those of the other display modes. Although the focus guide display mode has been described with reference to FIGS. 3A to 3D in the present embodiment, there is no limitation thereto. Moreover, although the focus guide displays the degree of focus based on the defocus amount based on the signal (the imaging-plane phase-difference signal) obtained from the imaging device 111, there is no limitation thereto. The degree of focus may be represented on the basis of the output value from a focal point detection sensor (a phase-difference sensor or the like) set to a place different from the imaging plane, and the degree of focus may be represented on the basis of the contrast value. Moreover, the focus guide represents the extent to which the focal point deviates from the in-focus state when the subject is not in-focus.

<Focus Guide Display Process>

Next, a focus guide display process executed by the camera control unit 117 will be described.

Figure 4:
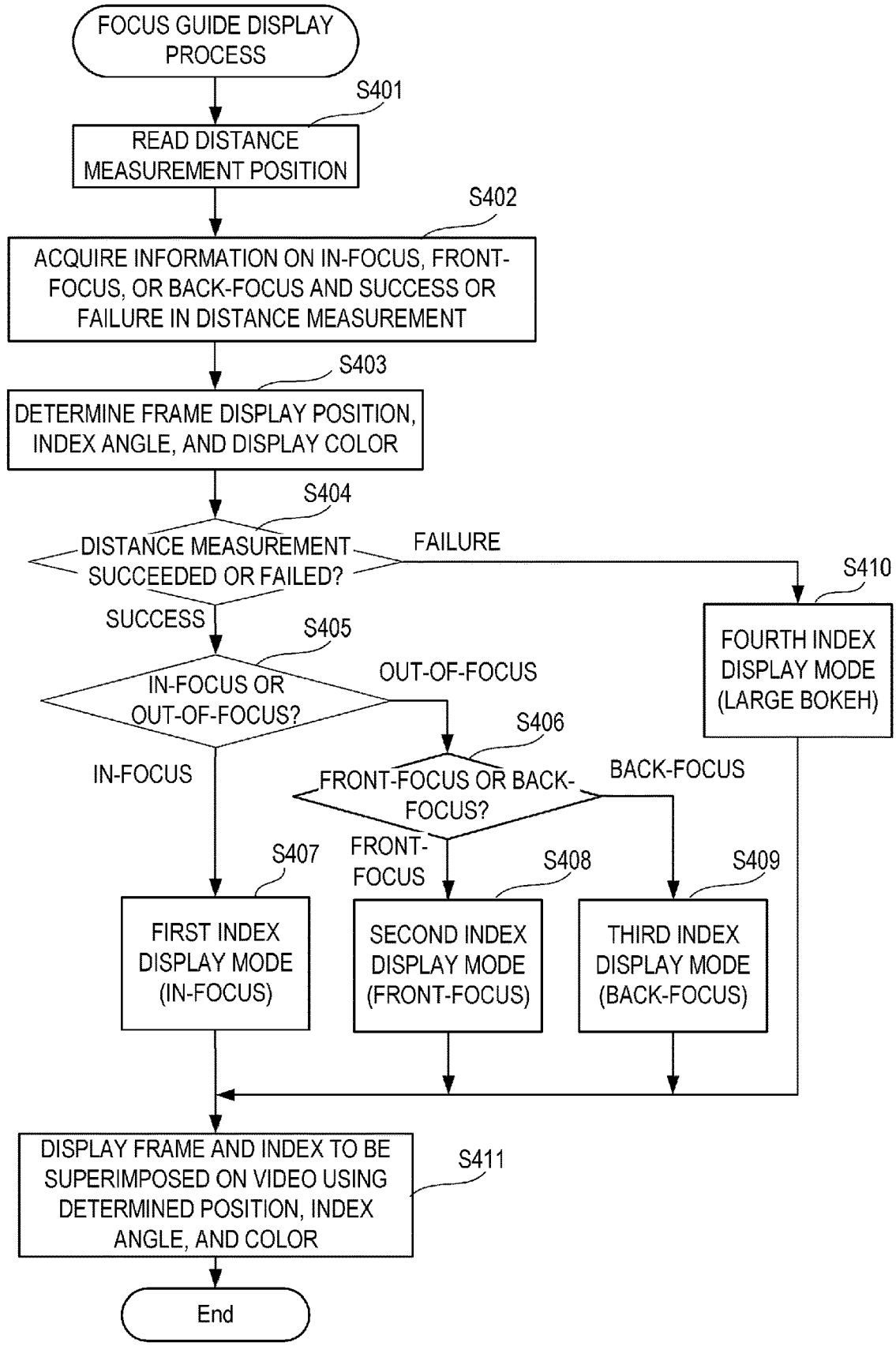
FIG. 4 is a flowchart related to a focus guide displaying process.

FIG. 4 is a flowchart illustrating the flow of a focus guide display process executed by the camera control unit 117. This process is realized when the program recorded on the nonvolatile memory 120 is deployed onto the system memory 121 and is executed by the camera control unit 117.

In step S401, the camera control unit 117 reads a distance measurement position (a position at which the focus frame 300 is set) stored in the system memory 121 included in the camera control unit 117.

In step S402, the camera control unit 117 acquires information related to focus (for example, in-focus information and information on success in distance measurement) with respect to the subject corresponding to the distance measurement position obtained in step S401 from the focus signal processor 114. The in-focus information includes information on whether a subject is in an in-focus state, a front-focus state, or a back-focus state, and in the case of the front-focus state or the back-focus state, the in-focus information includes distance information (information on the degree of focus) between the in-focus point and the subject.

In step S403, the camera control unit 117 determines a frame display position, an index angle, and a display color to be displayed by the display unit 115 on the basis of the information obtained in steps S401 and S402.

In step S404, the camera control unit 117 determines whether distance measurement has succeeded or failed on the basis of the information obtained in step S402. When it is determined that the distance measurement has succeeded, the flow proceeds to step S405. When it is determined that the distance measurement has failed, the flow proceeds to step S410.

In step S405, the camera control unit 117 determines whether the subject is in an in-focus state or an out-of-focus state on the basis of the information obtained in step S402. When it is determined that the subject is in an in-focus state, the flow proceeds to step S407. When it is determined that the subject is in an out-of-focus state, the flow proceeds to step S406.

In step S406, the camera control unit 117 determines whether the subject is in a front-focus state or a back-focus state on the basis of the information obtained in step S402. When it is determined that the subject is in a front-focus state, the flow proceeds to step S408. When it is determined that the subject is in a back-focus state, the flow proceeds to step S409.

In step S407, the camera control unit 117 selects data corresponding to the first index display mode (that is, an index display mode when the subject is in the in-focus state). A display example of the index and frame data corresponding to this case is illustrated in FIG. 3A.

In step S408, the camera control unit 117 selects data corresponding to the second index display mode (that is, an index display mode when the subject is in the front-focus state). A display example of the index and frame data corresponding to this case is illustrated in FIG. 3B.

In step S409, the camera control unit 117 selects data corresponding to the third index display mode (that is, an index display mode when the subject is in the back-focus state). A display example of the index and frame data corresponding to this case is illustrated in FIG. 3C.

In step S410, the camera control unit 117 selects data corresponding to the fourth index display mode (that is, an index display mode when the subject is in a large-Bokeh state). A display example of the index and frame data corresponding to this case is illustrated in FIG. 3D.

In step S411, the camera control unit 117 displays the index and frame data selected in any one of steps S407 to S410 at a display position on the display unit 115 so as to be superimposed on a video (a live-view image) in the following manner. That is, the index and frame data selected in any one of steps S407 to S410 is displayed at a display position on the display unit 115 so as to be superimposed on a video (a live-view image) using the display position, the index angle, and the display color determined in step S403.

Hereinafter, display control of the display unit 115 executed by the camera control unit 117 will be described with reference to Embodiments 1 and 2.

In the display control of the present embodiment, in a state in which a live-view image is displayed after an autofocus operation is performed, when manual focus adjustment is performed by operating a focus ring or the like, the display mode of the display unit 115 is put into a display mode corresponding to a setting state of a predetermined function. The description of elements and processes similar to those of the above-described embodiment will be omitted.

Embodiment 1

Hereinafter, Embodiment 1 will be described with reference to FIG. 5 and parts (A) to (C) in FIG. 6.

In the present embodiment, a mode in which a live-view image is enlarged or a focus guide is displayed according to a focus guide setting when manual focus adjustment is performed by operating a focus ring after an autofocus operation is executed will be described. Here, enlarged display means displaying a live-view image displayed with a first magnification (for example, a normal magnification) with a second magnification larger than the first magnification.

Figure 5:
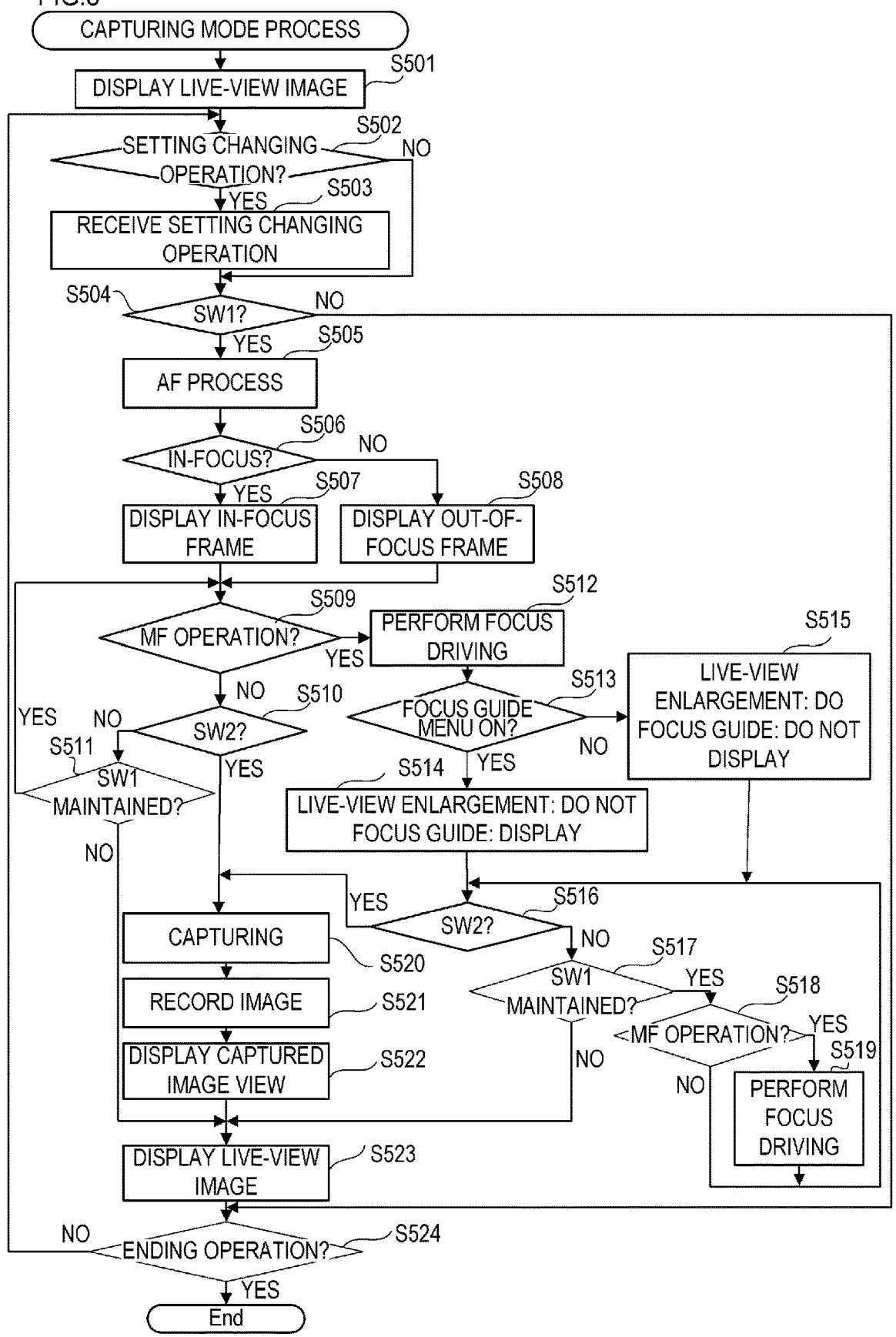
FIG. 5 is a flowchart related to a capturing mode process according to Embodiment 1.

FIG. 5 is a flowchart related to a capturing mode process according to the present embodiment. Parts (A) to (C) in FIG. 6 are diagrams illustrating an example of a screen (a display mode) of the display unit 115 on which a live-view image of the present embodiment is displayed.

Hereinafter, a capturing mode process according to the present embodiment will be described. This process is realized when a program recorded on the nonvolatile memory 120 is deployed onto the system memory 121 and is executed by the camera control unit 117. Here, the capturing mode process is a mode for performing capturing.

In step S501, when a capturing mode starts, the camera control unit 117 causes the imaging device 111 to capture a live-view image and causes the captured live-view image to be displayed on the display unit 115.

In step S502, the camera control unit 117 determines whether an operation of changing the focus guide setting has been performed. A user can display a menu screen of a setting item list and select a setting item of "focus guide setting" as display setting for AF+MF (when an MF operation is performed while half-pressing the shutter after an AF operation is performed). When an operation of displaying the menu screen is performed and the setting item of "focus guide setting" during AF+MF is selected, it is determined that an operation of changing the focus guide setting has been performed. The flow proceeds to step S503 when it is determined that the setting changing operation has been performed, and otherwise, the flow proceeds to step S504.

In step S503, the camera control unit 117 receives the operation of changing the "focus guide setting". In the focus guide setting, the focus guide may be displayed (ON) or may not be displayed (OFF) during AF+MF. The setting content is recorded on the nonvolatile memory 120.

When reception of the setting changing operation in step S503 ends, the flow proceeds to step S504.

In step S504, the camera control unit 117 determines whether SW1 is turned on (whether a shutter button is half-pressed). When it is determined that SW1 is turned on, the flow proceeds to step S505 and an autofocus process is executed. Otherwise, the flow proceeds to step S524.

In step S506, the camera control unit 117 determines whether an in-focus state is realized by the autofocus process in step S505. When it is determined that an in-focus state is realized, the flow proceeds to step S507, and an in-focus state (an in-focus frame) is displayed on the live-view image. Otherwise, the flow proceeds to step S508, and an out-of-focus state (an out-of-focus frame) is displayed on the live-view image. After step S507 or S508 is performed, the flow proceeds to step S509.

Figure 6:
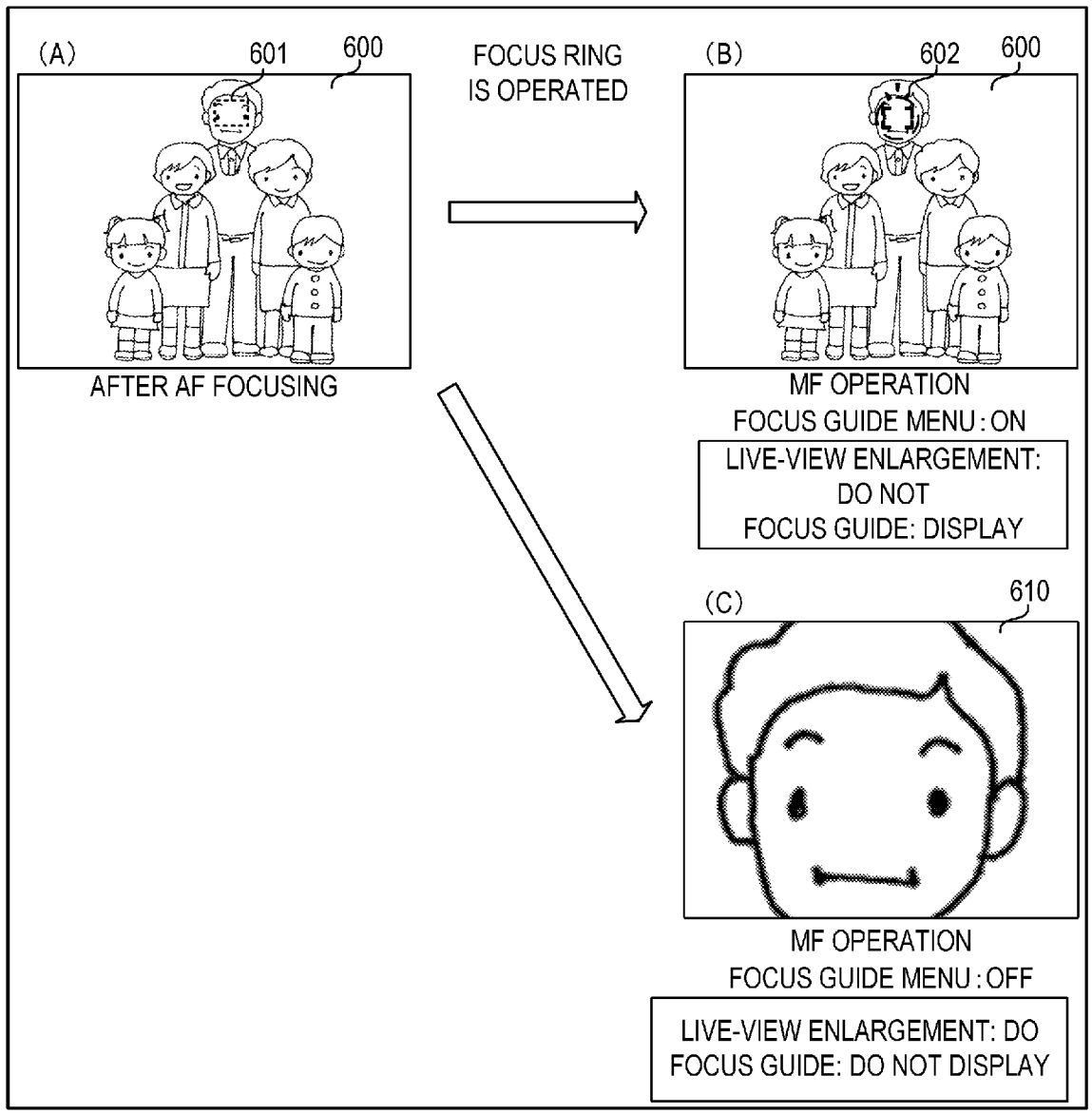
FIG. 6 is a diagram illustrating display examples of a live-view image according to Embodiment 1.

Part (A) in FIG. 6 illustrates an example of the screen of the display unit 115 when an in-focus state is displayed on the live-view image in step S507. In part (A) in FIG. 6, a live-view image 600 is displayed with a normal magnification (a magnification in which the entire live-view image falls within a display range). As a result of autofocus, the face of a male at the horizontal center is in-focus, a green in-focus frame 601 indicating an in-focus state is displayed. When an in-focus state is not realized, a white frame (an out-of-focus frame) is displayed.

In step S509, the camera control unit 117 determines whether a focus ring has been operated (an MF operation has been performed) after the autofocus process was executed in step S505. When it is determined that the focus ring has been operated, the flow proceeds to step S512. Otherwise, the flow proceeds to step S510.

In step S510, the camera control unit 117 determines whether SW2 is turned on (whether the shutter button is full-pressed). When it is determined that SW2 is not turned on, the flow proceeds to step S511. When it is determined that SW2 is turned on, the flow proceeds to step S520.

In step S511, the camera control unit 117 determines whether the on state of SW1 is maintained (whether half-pressing of the shutter button is maintained). When it is determined that the on state of SW1 is not maintained, the flow proceeds to step S523, and the camera returns to a normal capturing standby state (a live-view screen) without displaying the in-focus frame or the out-of-focus frame. When the on state of SW1 is maintained, the flow returns to step S509 and the process is repeated.

In step S512, the camera control unit 117 performs focus driving according to the amount of the MF operation determined in step S509. That is, a driving control signal for a focus lens is transmitted to the lens control unit 106 on the basis of the pulse signal received from the focus ring. The lens control unit 106 controls the focus lens driver 105 according to a signal received from the camera control unit 117 to move the focus position to the closest side or the telephoto side. When the focus lens is driven, the lens control unit 106 transmits information indicating the position of the focus lens to the camera control unit 117. Rather than driving the focus lens according to an instruction from the camera control unit 117, the lens control unit 106 may drive the focus lens directly according to an operation of the focus ring.

In step S513, the camera control unit 117 determines whether the focus guide setting is set to on or off by referring to the setting information recorded on the nonvolatile memory 120. When it is determined that the focus guide setting is set to on, the flow proceeds to step S514. When it is determined that the focus guide setting is set to off, the flow proceeds to step S515.

In step S514 where the focus guide setting is set to on, the camera control unit 117 displays the focus guide without enlarging the live-view image. In this way, it is possible to display the focus guide while maintaining the view angle during autofocus and to assist manual focus adjustment.

Part (B) in FIG. 6 illustrates a display example on the display unit 115 in step S514. A live-view screen in this case is a screen transitioned from the screen illustrated in part (A) in FIG. 6 in which an in-focus state is displayed in step S507 when the focus ring is operated (an MF operation is performed). A focus guide 602 is superimposed and displayed on a live-view image 600 with a normal magnification. An in-focus frame or an out-of-focus frame (an in-focus frame 601 superimposed on the face of a male at the horizontal center in the example of part (A) in FIG. 6) indicating the AF result displayed before the MF operation was performed changes to a focus guide 602 when the MF operation is performed.

In step S515 where the focus guide setting is set to off, the camera control unit 117 enlarges the live-view image and does not display the focus guide. In enlargement of the live-view image, a partial range of an entire capturing range about a focus adjustment position (that is, the position of an in-focus frame or an out-of-focus frame) when AF was performed is enlarged. In this manner, by enlarging the live-view image, a state in which a user can visually perform manual focus adjustment can be created. Part (C) in FIG. 6 illustrates a display example on the display unit 115 in this case. A live-view screen in this case is a screen transitioned from the screen illustrated in part (A) in FIG. 6 in which an in-focus state is displayed in step S507 when the focus ring was operated. The enlarged live-view image 610 is displayed and the focus guide 602 is not displayed. Therefore, a user can perform an MF operation while checking whether a focusing state as intended is realized in detail by looking at the enlarged live-view image 610 (the face of a male in the illustrated example).

In step S516, the camera control unit 117 determines whether SW2 is turned on (whether the shutter button is full-pressed). The flow proceeds to step S517 when SW2 is not turned on, and the flow proceeds to step S520 when SW2 is turned on.

In S517, the camera control unit 117 determines whether the on state of SW1 is maintained (whether half-pressing of the shutter button is maintained). When it is determined that the on state of SW1 is maintained, the flow proceeds to S518. Otherwise (when SW1 is turned off), the flow proceeds to S523. When the flow proceeds to step S523, the display of the focus guide or the enlargement of the live-view image is cancelled and a live-view image of a normal magnification is displayed.

In step S518, the camera control unit 117 determines whether an MF operation is performed similarly to step S509. When the MF operation is performed, the flow proceeds to step S519. Otherwise, the flow proceeds to S516.

In step S519, the camera control unit 117 performs focus driving similarly to step S512. Rather than performing the focus driving according to the control of the camera control unit 117 as in step S512, the focus driving may be controlled directly by lenses.

In step S520, the camera control unit 117 performs main capturing (capturing for acquiring an image serving as an image file rather than live-view capturing). That is, exposure is performed for an exposure period based on a set shutter speed to generate an image file.

In step S521, the camera control unit 117 records the image file generated in step S520 on the recording unit 116.

In step S522, the camera control unit 117 displays the image captured in step S520 on the display unit 115 for a predetermined period for a reviewing purpose (confirmation display, REC review, and quick review). When it is set such that review display is not to be performed, the process of S522 is skipped.

In step S523, the camera control unit 117 displays a live-view image on the display unit 115 in a normal magnification. A present capturing mode, a remaining battery capacity, a recording quality setting (an image size and a compression ratio), and various capturing settings (a strobe setting content, a shutter speed, a diaphragm value, exposure correction, ISO sensitivity, and the like) are also displayed together with the live-view image of the normal magnification. This process is similar to the process of S501.

In step S524, the camera control unit 117 determines whether an operation of ending live-view display has been performed. When it is determined that an operation of ending the live-view display is performed, the display of a live-view image ends. Otherwise, the flow returns to step S502 and live-view display is continued.

The example of FIG. 5 illustrates a case in which the focus setting is set to the AF mode, and the focus driving is not performed even when the focus ring is operated before AF was performed (that is, in a state in which SW1 is turned off). In this case, the operation of the focus ring is ignored and other functions other than MF adjustment are executed (for example, capturing settings such as a diaphragm value and a shutter speed are changed). When an MF mode (a mode where AF is not performed) is set, a focus guide is always displayed before an MF operation was performed regardless of the setting content of the focus guide setting during AF+MF.

As described above, in the present embodiment, when manual focus adjustment is performed by operating the focus ring after autofocus is executed, a live-view image is enlarged or a focus guide is displayed according to the setting of the focus guide. In this case, a predetermined focus guide setting is set to on, a live-view image is not enlarged but the focus guide can be displayed. When the focus guide setting is set to off, the live-view image is enlarged.

In this manner, it is possible to assist manual focus adjustment (MF operation) selectively according to a content set in advance by the user. When the focus guide setting is set to on, a user can perform manual focus adjustment while checking the entire composition of the live-view image that is not enlarged. When the focus guide setting is set to off, the user can check the focusing state around the AF position to perform an MF operation while looking at the enlarged live-view image. The user can select a method with which the MF operation after AF was executed will be performed according to the predetermined focus guide setting. Therefore, it is possible to improve the user's convenience.

In the present embodiment, a live-view image is enlarged or a focus guide is displayed according to the focus guide setting when an MF operation is performed after autofocus is executed. However, there is no limitation thereto. For example, when an MF operation is performed after autofocus is executed, the live-view image may be enlarged or the focus guide may be displayed according to the enlarged display setting. In this case, a relation between the display mode of the display unit 115 during an MF operation and whether the live-view image will be displayed at an enlarged scale or not will be described. When the focus guide is displayed without enlarging the live-view image during the MF operation, enlarged display setting is set such that the live-view image is not enlarged. When the live-view image is enlarged and the focus guide is not displayed, enlarged display setting is set to on. That is, "live-view enlargement" (hereinafter sometimes referred to simply as enlargement display setting) may be set to "do" or "do not" as the display setting during AF+MF included in the menu screen. When the setting is set to "do", a live-view image is enlarged according to the MF operation after AF was executed, and the focus guide is not displayed (see part (C) in FIG. 6). When the setting is set to "do not", a focus guide is displayed according to the MF operation after AF was executed, and a live-view image is not enlarged (see part (B) in FIG. 6).

Embodiment 2

Hereinafter, Embodiment 2 will be described with reference to FIG. 7 and parts (A) to (D) in FIG. 8.

In the present embodiment, a mode in which a live-view image is enlarged or a focus guide is displayed according to a focus guide setting and an enlarged display setting when an MF operation is performed after autofocus is executed will be described.

Figure 7:
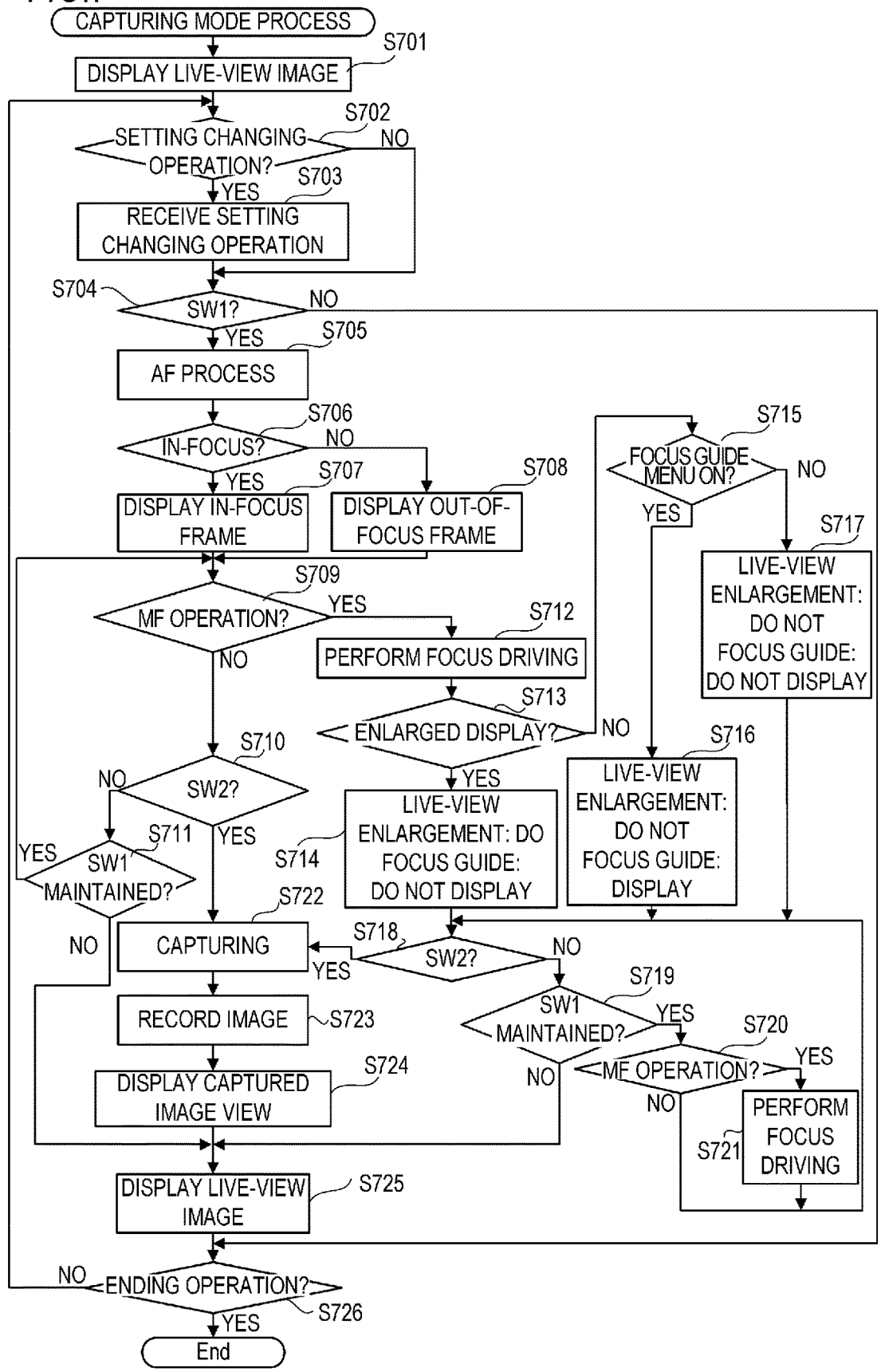
FIG. 7 is a flowchart related to a capturing mode process according to Embodiment 2.

FIG. 7 is a flowchart related to a capturing mode process according to the present embodiment. Parts (A) to (D) in FIG. 8 are diagrams illustrating an example of the screen of the display unit 115 when a live-view image of the present embodiment is displayed.

Hereinafter, a capturing mode process according to the present embodiment will be described. This process is realized when a program recorded on the nonvolatile memory 120 is deployed onto the system memory 121 and is executed by the camera control unit 117.

The process of step S701 illustrated in FIG. 7 is similar to the process of step S501 described in FIG. 5.

In step S702, the camera control unit 117 determines whether an operation of changing the focus guide setting or an operation of changing the enlarged display setting has been performed. When a menu screen of the setting item list is displayed and a setting item of "focus guide setting" or a setting item of "live-view enlargement" as the display setting during AF+MF is selected, it is determined that the setting changing operation has been performed. The flow proceeds to step S703 when it is determined that the setting changing operation has been performed, and otherwise, the flow proceeds to step S704.

In step S703, the camera control unit 117 receives the operation of changing the "focus guide setting" or the "live-view enlargement setting". The set content is recorded on the nonvolatile memory 120.

Since the processes of steps S704 to S712 are similar to the processes of steps S504 to S512 described in FIG. 5, the description thereof will be omitted. Part (A) in FIG. 8 illustrates a display example of the display unit 115 when an in-focus frame is displayed on the live-view image in step S707. In this case, an in-focus frame 801 is displayed on the live-view screen so as overlap a live-view image 800.

In step S713, the camera control unit 117 determines whether the setting of the setting item of "live-view enlargement" is set to "do" by referring to the setting information recorded on the nonvolatile memory 120. When it is determined that the setting is set to "do" (a live-view image is enlarged), the flow proceeds to step S714. Otherwise, the flow proceeds to step S715.

In step S714 where the enlarged display setting of the live-view image is set to "do", the camera control unit 117 enlarges the live-view image regardless of the focus guide setting and does not display the focus guide. In enlargement of the live-view image, a partial range of an entire capturing range about a focus adjustment position (that is, the position of an in-focus frame or an out-of-focus frame) when AF was performed is enlarged. In this manner, by enlarging the live-view image, a state in which a user can visually perform manual focus adjustment can be created.

Figure 8:
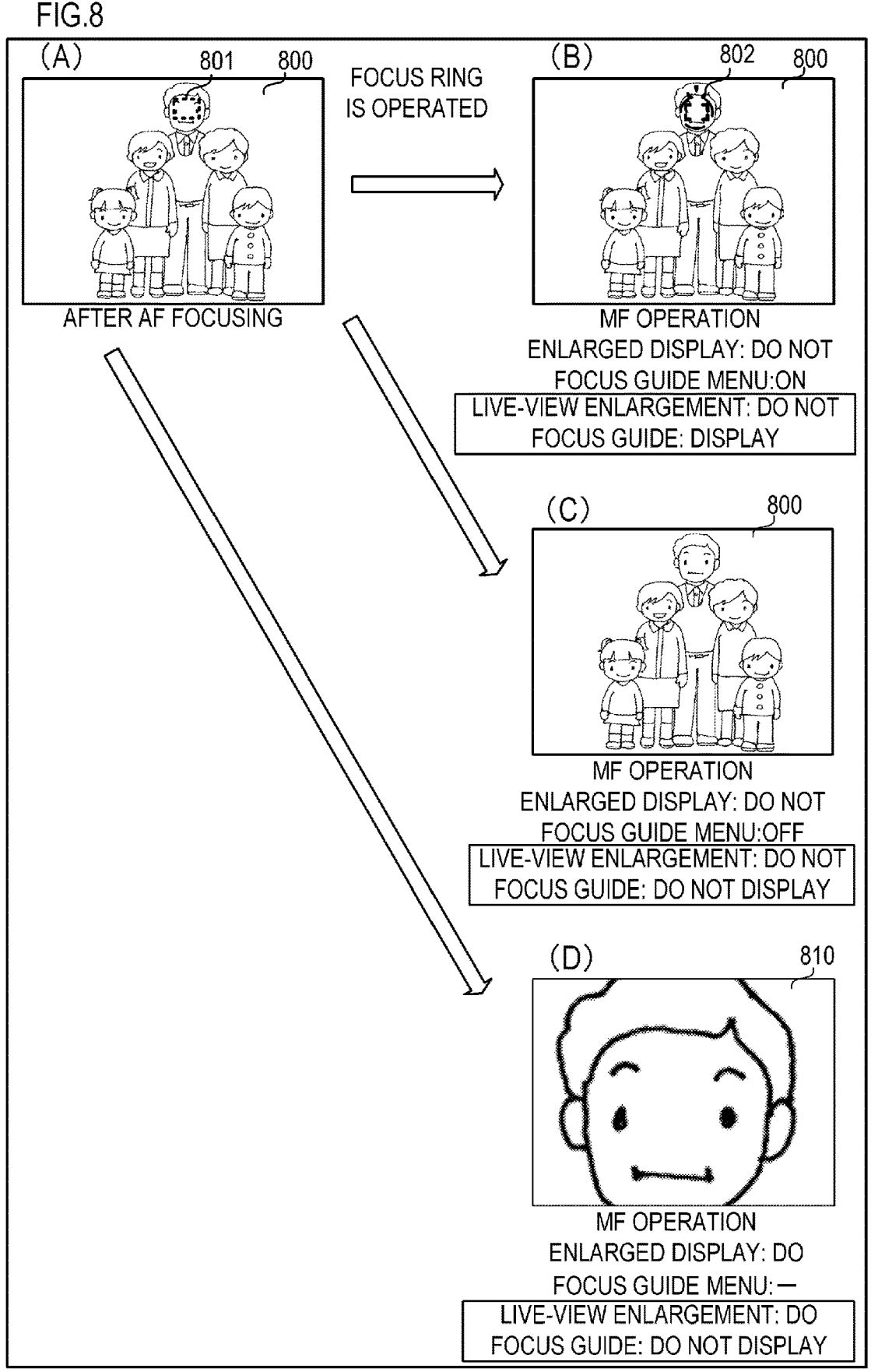
FIG. 8 is a diagram illustrating display examples of a live-view image according to Embodiment 2.

Part (D) in FIG. 8 illustrates a display example on the display unit 115 when the live-view image is enlarged and the focus guide is not displayed in step S714. A live-view screen in this case is a screen transitioned from the screen illustrated in part (A) in FIG. 8 in which an in-focus state is displayed in step S707 when the focus ring is operated, and the enlarged live-view image 810 is displayed.

In step S715, the camera control unit 117 determines whether the setting of the setting item of "focus guide setting" is set to "ON" by referring to the setting information recorded on the nonvolatile memory 120. When the setting is set to "ON" (the focus guide is displayed), the flow proceeds to step S716. Otherwise, the flow proceeds to step S717.

In step S716 where the enlarged display setting of the live-view image is set to "do not" and the focus guide setting is set to "ON", the camera control unit 117 does not enlarge the live-view image and displays the focus guide. In this way, it is possible to display the focus guide while maintaining the view angle during autofocus and to assist manual focus adjustment.

Part (B) in FIG. 8 illustrates a display example on the display unit 115 in step S716. A live-view screen in this case is a screen transitioned from the screen illustrated in part (A) in FIG. 8 in which an in-focus state is displayed in step S707 when the focus ring is operated. A focus guide 802 is superimposed and displayed on the live-view image 800 with a normal magnification. An in-focus frame or an out-of-focus frame (an in-focus frame 801 superimposed on the face of a male at the horizontal center in the example of part (A) in FIG. 8) indicating the AF result displayed before the MF operation was performed changes to a focus guide 802 when the MF operation is performed.

In step S717 where the enlarged display setting of the live-view image is set to "do not" and the focus guide setting is set to "OFF", the camera control unit 117 does not enlarge the live-view image and does not display the focus guide. In this way, a state in which a user can visually perform manual focus adjustment while maintaining the view angle during autofocus can be created.

Part (C) in FIG. 8 illustrates a display example on the display unit 115 in step S717. A live-view screen in this case is a screen transitioned from the screen illustrated in part (A) in FIG. 8 in which an in-focus state is displayed in step S707 when the focus ring is operated. The live-view image 800 with a normal magnification is displayed, and the in-focus frame 801 and the focus guide 802 are not displayed. That is, the in-focus frame 801 displayed in part (A) in FIG. 8 disappears according to the MF operation (since an in-focus state is not realized because the focus driving is performed by the MF operation).

Since the processes of steps S718 to S726 are similar to the processes of steps S516 to S524 described in FIG. 5, the description thereof will be omitted.

As described above, in the present embodiment, similarly to Embodiment 1 described above, it is possible to assist manual focus adjustment. In this way, the user can select depending on the purpose whether the user will perform an MF operation while checking the entire composition of the live-view image that is not enlarged or perform the MF operation while checking the enlarged live-view image. Therefore, it is possible to improve the user's convenience.

In the respective embodiments described above, the focus guide is not displayed when the live-view image is displayed at an enlarged scale. However, the present invention is not limited thereto but the focus guide may be displayed when the live-view image is displayed at an enlarged scale. Moreover, a state (part (B) in FIG. 6 or part (B) in FIG. 8) in which the live-view image is not enlarged and the focus guide is displayed may transition to a state (part (C) in FIG. 6 or part (C) in FIG. 8) in which the live-view image is enlarged according to a specific single operation.

In the present embodiment, display control in which the display mode of the display unit 115 is changed to a display mode corresponding to a setting state of a predetermined function when manual focus adjustment is performed according to a focus ring operation after autofocus was executed. However, the display mode of the display unit 115 may be changed to a display mode corresponding to the setting state of a predetermined function when the manual focus adjustment is performed according to a focus ring operation without being limited to the condition after the autofocus was executed.

Various control processes described as being performed by the camera control unit 117 may be performed by one hardware component, and a plurality of hardware components (for example, a plurality of processors or circuits) may share the processes to perform the control of the entire apparatus.

While the present invention has been described in detail on the basis of the preferred embodiments, the present invention is not limited to these specific embodiments, but includes various embodiments made without departing from the spirit of the present invention. The respective embodiments described above illustrate an embodiment of the present invention and the respective embodiments may be combined appropriately.

In the above-described embodiment, a case in which the present invention is applied to an imaging system has been described as an example. The present invention is not limited to this example, but the present invention can be applied to a display controller which can display a display item related to focus and display an image at an enlarged scale. That is, the present invention can be applied to a personal computer, a PDA, a cellular phone terminal, a portable image viewer, a printer apparatus having a display, a digital photo frame, a music player, a game console, an electronic book reader, and the like.

The present invention can be applied to a controller that communicates with an imaging apparatus (including a network camera) via cable or wireless communication to control the imaging apparatus at a remote site without being limited to the imaging apparatus body. Examples of an apparatus that controls the imaging apparatus at a remote site include a smartphone, a table PC, a desktop PC, and the like. The imaging apparatus can be controlled from a remote site by transmitting a command for causing the imaging apparatus to perform various operations and set settings from the controller on the basis of an operation performed on the controller or a process performed on the controller. A live-view image captured by the imaging apparatus can be received via cable or wireless communication and be displayed on the controller.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-020109, filed on Feb. 7, 2018, which is hereby incorporated by reference herein in its entirety.

What is claimed is:

1. An electronic apparatus comprising:
at least one processor and/or at least one circuit and a memory storing instructions which cause the at least one processor and/or the at least one circuit to perform the operations of the following units:
a receiving unit configured to receive a manual focus operation;
a first setting unit configured to set whether to enlarge a live-view image which is captured by an imaging unit in accordance with the manual focus operation;
a second setting unit configured to set whether to display a display item which indicates a direction and an amount of deviation from a focus point of a subject to a position where the display item is displayed; and
a display control unit configured to, in response to what the receiving unit receives the in manual focus operation, perform control such that an image is displayed in a display mode based on a content set by the first setting unit and a content set by the second setting unit, among a plurality of display modes including a first display mode and a second display mode wherein
the display control unit performs control such that, 1) before the receiving unit receives the manual focus operation, the live-view image is displayed with a first magnification and the display item is not displayed, regardless of the content set by the second setting unit,
2) an image is displayed in the first display mode, in response to what the receiving unit starts to receive in the manual focus operation in a case where the first setting unit sets not to enlarge the live-view image and the second setting unit sets to display the display item superimposed on the live-view image,
3) an image is displayed in the second display mode, in response to what the receiving unit starts to receive in the manual focus operation in a case where the first setting unit sets to enlarge the live-view image, and
4) after the live-view image is displayed with the first magnification or a second magnification larger than the first magnification in response to what the receiving unit starts to receive in the manual focus operation, a manual focus adjustment is performed in accordance with an amount of the manual focus operation without changing the magnification of the live-view image, in response to what the receiving unit receives in the manual focus operation,
the first display mode is a display mode in which the display item is superimposed and displayed on the live-view image without enlarging the live-view image from the first magnification; and
the second display mode is a display mode in which the live-view image is displayed with the second magnification and the display item is not displayed to be superimposed on the live-view image regardless of the content set by the second setting unit.

2. The electronic apparatus according to claim 1, wherein the display control unit is further configured to perform to control such that:

in a case where 1) the receiving unit has received the manual focus operation in the state in which the display item is not superimposed or displayed on the live-view image and the live-view image is displayed with the first magnification, 2) the first setting unit sets not to enlarge the live-view image and 3) the second setting unit sets to display the display item, an image is displayed in the first display mode, in a case where 4) the receiving unit has received the manual focus operation in the state in which the display item is not superimposed or displayed on the live-view image and the live-view image is displayed with the first magnification, 5) the first setting unit sets not to enlarge the live-view image and 6) the second setting unit sets not to display the display item, the display item is not displayed and the live-view image is not enlarged from the first magnification as a third display mode.

3. The electronic apparatus according to claim 1, wherein the state in which the display item is not superimposed or displayed on the live-view image and the live-view image is displayed with the first magnification is a state after an autofocus operation is executed.

4. The electronic apparatus according to claim 3, wherein the display control unit further configured to performs control so that the display item is displayed instead of a display element indicating whether an in-focus state is created or not, displayed as a result of autofocus.

5. The electronic apparatus according to claim 1, wherein the display item is a display item indicating a degree of focus.

6. A control method of a display controller, comprising:
a receiving step of receiving a manual focus operation;
a first setting step of setting whether to enlarge a live-view image which is captured by an imaging unit in accordance with the manual focus operation;
a second setting step of setting whether to display a display item which indicates a direction and an amount of deviation from a focus point of a subject to a position where the display item is displayed;

in response to receiving the manual focus operation, performing control such that an image is displayed in a display mode based on a content set in the first setting step and a content set in the second setting step, among a plurality of display modes including a first display mode and a second display mode, and performing control such that, 1) before the manual focus operation is received in the receiving step, the live-view image is displayed with a first magnification and the display item is not displayed, regardless of the content set in the second setting step, 2) an image is displayed in the first display mode, in response to receiving the manual focus operation in the receiving step in a case where the first setting step sets not to enlarge the live-view image and the second setting step sets to display the display item superimposed on the live-view image, 3) an image is displayed in the second display mode, in response to starting to receive the manual focus operation in the receiving step in a case where the first setting step sets to enlarge the live-view image, and 4) after the live-view image is displayed with the first magnification or a second magnification larger than the first magnification in response to starting to receive the manual focus operation in the receiving step, a manual focus adjustment is performed in accordance with an amount of the manual focus operation without changing the magnification of the live-view image, in response to receiving the manual focus operation in the receiving step, the first display mode is a display mode in which the display item is superimposed and displayed on the live-view image without enlarging the live-view image from the first magnification; and the second display mode is a display mode in which the live-view image is displayed with the second magnification and the display item is not displayed to be superimposed on the live-view image regardless of the content set in the second setting step.

7. A non-transitory computer-readable storage medium storing a program for causing a computer to execute the control method according to claim 6.

* * * * *